United States Patent
Hess et al.

(10) Patent No.: US 10,927,880 B2
(45) Date of Patent: Feb. 23, 2021

(54) LOCKING MECHANISMS WITH SUBSTRATE-FIXED WASHERS

(71) Applicant: Enduralock, LLC., Lenexa, KS (US)

(72) Inventors: Harold Hess, Leawood, KS (US);
Tracy Hockenhull, Lenexa, KS (US);
Warren Moore, Lenexa, KS (US);
Armando Perez, III, Los Angeles, CA (US); Zoltan Kalman Furu-Szekely, Cypress, TX (US)

(73) Assignee: Enduralock, LLC, Lenexa, KS (US)

( * ) Notice: Subject to any disclaimer, the term of this patent is extended or adjusted under 35 U.S.C. 154(b) by 0 days.

(21) Appl. No.: 16/403,243

(22) Filed: May 3, 2019

(65) Prior Publication Data
US 2019/0257350 A1    Aug. 22, 2019

Related U.S. Application Data

(63) Continuation of application No. 15/447,655, filed on Mar. 2, 2017, now Pat. No. 10,323,678.
(Continued)

(51) Int. Cl.
*F16B 39/32* (2006.01)
*F16B 39/26* (2006.01)
(Continued)

(52) U.S. Cl.
CPC .............. *F16B 39/32* (2013.01); *F16B 39/24* (2013.01); *F16B 39/26* (2013.01); *F16B 39/282* (2013.01)

(58) Field of Classification Search
CPC ........ F16B 39/24; F16B 39/26; F16B 39/282; F16B 39/32; Y10S 411/95; Y10S 411/951; Y10S 411/953
(Continued)

(56) References Cited

U.S. PATENT DOCUMENTS

| 588,346 A | 8/1897 | Mireault |
| 677,212 A | 6/1901 | Heilman |

(Continued)

FOREIGN PATENT DOCUMENTS

| EP | 3283778 B1 | 1/2020 |
| JP | 2006307965 A | 11/2006 |

OTHER PUBLICATIONS

Notification of Transmittal of the International Search Report and the Written Opinion of the International Searching Authority, or the Declaration issued in connection with International Patent Application No. PCT/US2017/21733, dated Aug. 2, 2017, 11 pages.

(Continued)

*Primary Examiner* — Roberta S Delisle
(74) *Attorney, Agent, or Firm* — Armstrong Teasdale LLP

(57) ABSTRACT

A fastener assembly is provided and includes a fastener member and a washer member. The fastener member includes an end, an opposing head, and an elongated threaded body portion extending therebetween. The threaded body defines a center axis. The head includes a pawl arm having a pawl tooth and a flange. The washer member includes an axial aperture formed therethrough and a lock tab extending therefrom. The lock tab is configured to be received within a recess defined in a substrate member to rotationally fix the washer member relative to the substrate member. The washer member further includes a plurality of lock teeth. The pawl tooth is configured to intermesh with the lock teeth to allow rotation of the fastener member relative to the washer member in a first direction about the center axis, and substantially prevent rotation in an opposite second direction about the center axis.

20 Claims, 15 Drawing Sheets

Related U.S. Application Data

(60) Provisional application No. 62/310,475, filed on Mar. 18, 2016.

(51) Int. Cl.
*F16B 39/24* (2006.01)
*F16B 39/282* (2006.01)

(58) Field of Classification Search
USPC .................................. 411/326–327, 329–331
See application file for complete search history.

(56) References Cited

U.S. PATENT DOCUMENTS

| | | | |
|---|---|---|---|
| 687,774 | A | 12/1901 | Oliver |
| 1,000,196 | A * | 8/1911 | Rippingille et al. ..... F16B 39/32 411/299 |
| 1,181,494 | A | 5/1916 | Warren et al. |
| 1,317,567 | A | 9/1919 | Fewster |
| 1,334,804 | A * | 3/1920 | Schworm ................ F16B 39/32 411/331 |
| 1,646,805 | A | 10/1927 | Bell |
| 1,651,187 | A | 11/1927 | Cole |
| 1,916,526 | A | 7/1933 | Olson |
| 3,275,055 | A | 9/1966 | Gutshall |
| 5,533,849 | A | 7/1996 | Burdick |
| 5,606,753 | A | 3/1997 | Hashimoto |
| 5,618,143 | A | 7/1997 | Cronin, II et al. |
| 5,897,277 | A | 4/1999 | Barre et al. |
| 8,784,027 | B2 * | 7/2014 | Hess ....................... F16B 39/12 411/326 |
| 9,435,370 | B2 | 9/2016 | Hughes |
| 9,657,766 | B2 | 5/2017 | Hess |
| 9,719,550 | B2 | 8/2017 | Stewart |
| 2004/0036292 | A1 | 2/2004 | Austin |
| 2012/0063864 | A1 | 3/2012 | Hess |
| 2014/0026382 | A1 | 1/2014 | Smith et al. |
| 2014/0119849 | A1 | 5/2014 | Seaman et al. |
| 2014/0356097 | A1 | 12/2014 | Hess et al. |
| 2015/0110573 | A1 | 4/2015 | Hughes et al. |

OTHER PUBLICATIONS

European Extended Search Report, Application No. 17767199.7, dated Oct. 19, 2019, 10 pps.

* cited by examiner

LOCKING MECHANISMS WITH SUBSTRATE-FIXED WASHERS

CROSS REFERENCE TO RELATED APPLICATIONS

This application is a continuation application of U.S. patent application Ser. No. 15/447,655 filed Mar. 2, 2017, which claims priority to and the benefits of U.S. Provisional Patent Application Ser. No. 62/310,475 filed Mar. 18, 2016. These patent applications are hereby incorporated by reference in their entirety.

BACKGROUND

The field of the disclosure relates generally to fasteners, and more specifically to locking mechanisms for threaded fasteners with substrate fixed washers.

Fasteners commonly include mechanisms for ensuring that fastener elements do not loosen over time, potentially allowing joined elements to loosen or separate. Examples of mechanisms include thread bore inserts, and screw thread profiles that deform when tightened. Fastener accessories like lock washers, cotter pins, and lock wires are also commonly used with fasteners to prevent fastener elements from loosening. Adhesive materials, like epoxy, can be applied to fastener threads to stake fastener elements to prevent fastener elements from loosening. Such conventional mechanisms, accessories, and adhesive materials have generally been considered satisfactory for their intended purpose. However, such conventional fastener mechanisms, accessories, and adhesive materials may not be suitable for some applications, such as high pressure fluid connectors, high temperature environments, and/or with structures subject to vibration.

BRIEF DESCRIPTION

In one aspect, a fastener assembly is provided. The fastener assembly includes a fastener member having an end, an opposing head, and an elongated threaded body portion extending axially between the head and the end. The elongated threaded body defines a center axis. The head includes a pawl arm. The pawl arm includes a pawl tooth extending therefrom and a flange extending radially outward from the pawl arm. The fastener assembly also includes a washer member having an axial aperture formed therethrough and a lock tab extending from the washer member. The lock tab is configured to be received within a recess defined in a substrate member to rotationally fix the washer member relative to the substrate member. The washer member further includes a plurality of lock teeth extending therefrom. The pawl tooth is configured to intermesh with the plurality of lock teeth, such that the intermeshed pawl tooth and plurality of lock teeth allow rotation of the fastener member relative to the washer member in a first direction about the fastener member center axis, and substantially prevent rotation of the fastener member relative to the washer member in an opposite second direction about the fastener member center axis.

In another aspect, a fastener assembly is provided. The fastener assembly includes a conduit nut member defining a longitudinal axis and including a peripheral surface having an axially-extending slot defined therein. The fastener assembly also includes a lock member releasably coupled to the conduit nut member. The lock member includes an annular body and an axially-extending spring finger coupled to the annular body. The axially-extending spring finger includes a free end that extends radially inward relative to the annular body. The annular body includes a radially-extending detent member circumferentially aligned relative to the axially-extending spring finger. The fastener assembly further includes a lock washer including a lock tab and a circumferential wall that extends axially-upward about a periphery of the lock washer. The lock tab is configured to be received within a recess defined in a substrate member to rotationally fix the lock member relative to the substrate member. The circumferential wall defines an inner cavity for receiving a portion of the annular body of the lock member therein. The circumferential wall also includes a plurality of radially-extending notches defined therein. Each radially-extending notch of the plurality of radially-extending notches is configured to receive the radially-extending detent member.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Figure 1:
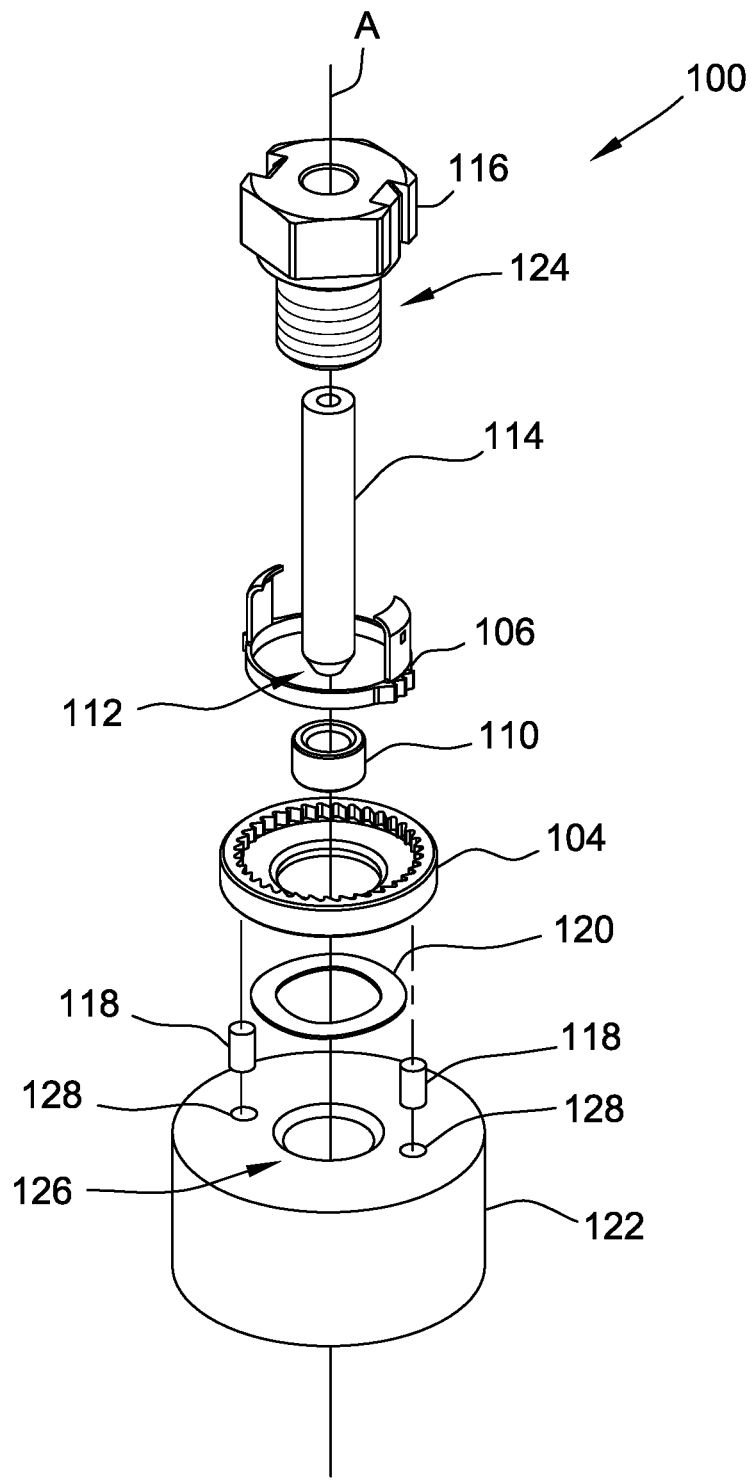
FIG. 1 is an exploded perspective view of a conduit fastener assembly.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms such as "about," "approximately," and "substantially" are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

Relative descriptors used herein such as upward, downward, left, right, up, down, length, height, width, thickness, and the like are with reference to the figures, and not meant in a limiting sense. Additionally, the illustrated embodiments can be understood as providing exemplary features of varying detail of certain embodiments, and therefore, features, components, modules, elements, and/or aspects of the illustrations can be otherwise combined, interconnected, sequenced, separated, interchanged, positioned, and/or rearranged without materially departing from the disclosed fastener assemblies. Additionally, the shapes and sizes of components are also exemplary and can be altered without materially affecting or limiting the disclosed technology.

The fastening devices and systems described herein are typically used to fixedly connect two or more components in a variety of applications such as, and without limitation, surgical implants, industrial applications, aerospace applications, and building applications. Among other features and benefits, the disclosed fastening devices and systems can provide one or more of quick and easy installation and/or removal, vibration resistant secured tightness, and/or single end access for blind fastening applications. In some embodiments, conduit fastening devices and systems are described herein and are typically used to fixedly connect or join two conduit ends or to couple a conduit end to another assembly, such as a manifold, a valve, a tank, and the like. For example, as described herein, when a tool is used with an associated fastener assembly, detent members, or teeth, on a fastener or nut member engage notches of a respective lock washer. When the detent members are engaged with the notches, the fastener or nut member is locked in rotation due to a rotational locking relationship of the lock washer to a fitting body, or substrate. For example, the lock washer includes lock tabs, or pins, that rotationally lock the lock washer to the fitting body. When the detent members are disengaged from the notches, the fastener or nut member is rotationally free relative to the fitting body. The advantages and other features of the technology disclosed herein will become more readily apparent to those having ordinary skill in the art from the following detailed description of the embodiments taken in conjunction with the drawings.

Figure 2:
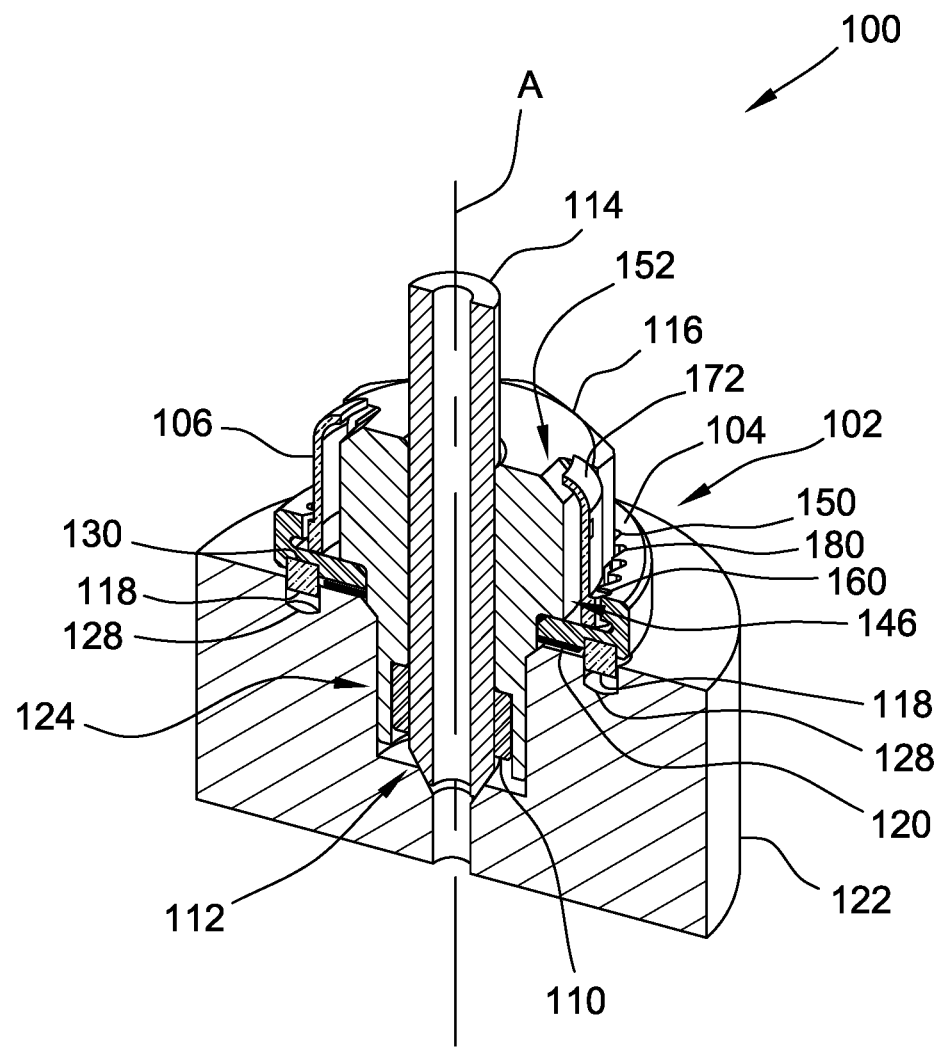
FIG. 2 is a sectional perspective view of the conduit fastener assembly shown in FIG. 1 in a first orientation, including a lock washer engaged with a lock member and rotationally fixed with respect to a fitting body.
Figure 3:
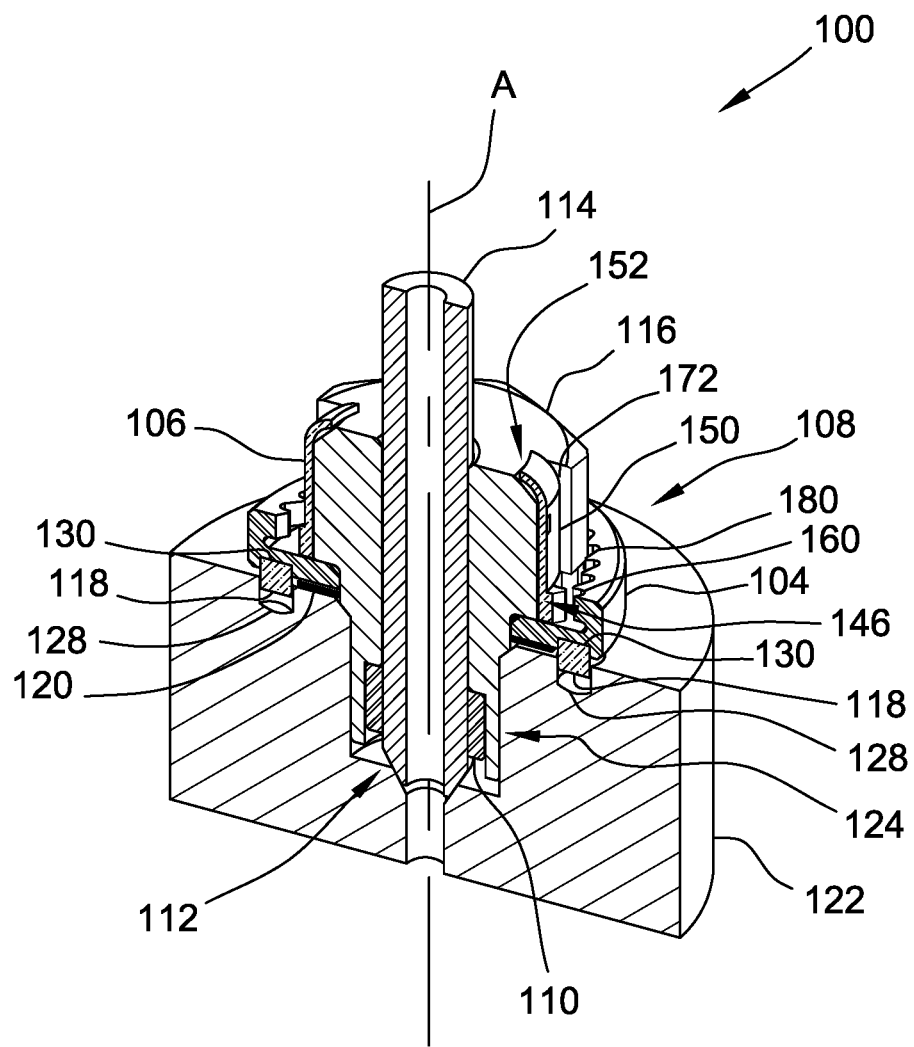
FIG. 3 is a sectional perspective view of the conduit fastener assembly shown in FIG. 1 in a second orientation, including the lock member disengaged from the lock washer and rotationally free with respect to the fitting body.

FIG. 1 is an exploded perspective view of a conduit fastener assembly 100. FIG. 2 is a sectional perspective view of conduit fastener assembly 100 in a first orientation 102, showing a lock washer 104 engaged with a lock member 106 and rotationally fixed with respect to a fitting body 122. FIG. 3 is a sectional perspective view of conduit fastener assembly 100 in a second orientation 108, showing lock member 106 disengaged from lock washer 104 and rotationally free with respect to fitting body 122. In the exemplary embodiment, conduit fastener assembly 100 is a flareless fitting, and in particular, a cone and thread fitting that includes a female threaded ferrule or collar 110 configured to threadably couple to an end portion 112 of cone and thread tubing 114. Alternatively, conduit fastener assembly 100 is any type of conduit fastener assembly, for example, and without limitation, a compression fitting, a flare fitting, a bite-type fitting, and/or a mechanical grip-type fitting.

In the exemplary embodiment, conduit fastener assembly 100 generally includes lock washer 104, lock member 106, a conduit nut member 116, one or more anti-rotation members 118, and a bias component 120. Conduit nut member 116 includes a male threaded portion 124 extending axially along a longitudinal axis "A." Male threaded portion 124 is configured to engage a female threaded portion 126 of fitting body 122. As shown in FIGS. 2 and 3, lock washer 104 is axially displaceable and rotationally locked with respect to fitting body 122 by use of anti-rotation members 118. In particular, each anti-rotation member 118 engages a fitting body hole 128 and a corresponding lock washer hole 130. While conduit fastener assembly 100 is depicted with two anti-rotation members 118, it is contemplated that conduit fastener assembly 100 can include fewer or greater than two anti-rotation members 118. In the exemplary embodiment, anti-rotation members 118 are pins. Alternatively, anti-rotation members 118 can be any type of anti-rotation members that enables conduit fastener assembly 100 to function as described herein.

In the exemplary embodiment, bias component 120 is disposed between lock washer 104 and fitting body 122 to facilitate biasing lock washer 104 against a bottom surface 132 (shown in FIG. 5) of a shoulder portion 134 (shown in FIG. 5) of conduit nut member 116. In particular, as described herein, conduit fastener assembly 100 is a cone and thread fitting where threaded collar 110 is threadably coupled to end portion 112 of cone and thread tubing 114. Threaded collar 110 is adjusted axially along cone and thread tubing 114. Conduit nut member 116 includes a stepped bore 136 (shown in FIG. 5) configured to receive threaded collar 110 therein and cone and thread tubing 114 therethrough. Conduit nut member 116 applies an axial force against cone and thread tubing 114, through threaded collar 110, such that end portion 112 of cone and thread tubing 114 seals against fitting body 122. As such, shoulder portion 134 of conduit nut member 116 does not seat tightly against lock washer 104. In the exemplary embodiment, bias component 120 biases lock washer 104 against conduit nut member 116 to facilitate engagement of lock member 106 with lock washer 104. Bias component 120 is, for example, and without limitation, a wave washer, a spring washer, or any other biasing component that enables conduit fastener assembly 100 to function as described herein.

Figure 4:
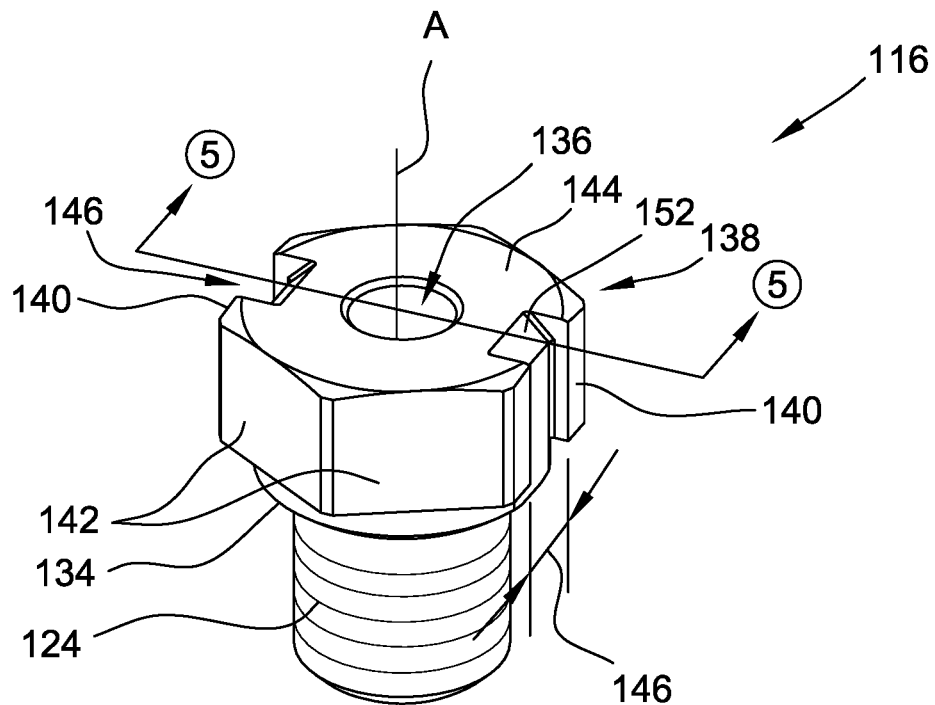
FIG. 4 is a perspective view of a conduit nut member of the conduit fastener assembly of FIG. 1.
Figure 5:
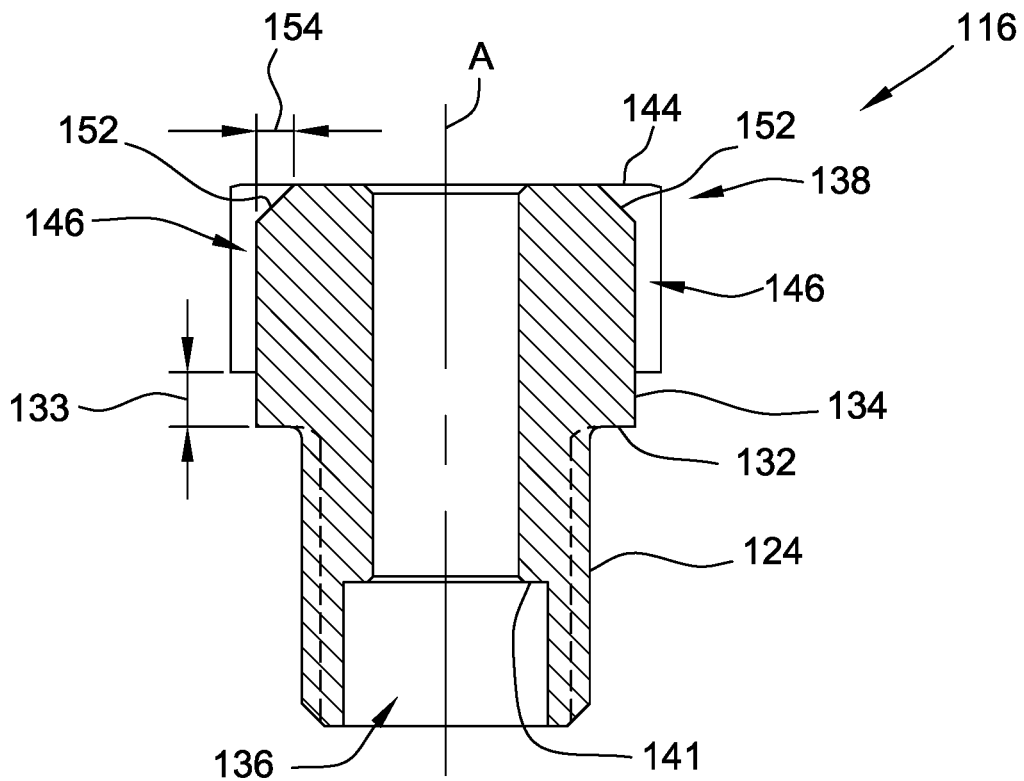
FIG. 5 is a sectional view of the conduit nut member shown in FIG. 4 taken through line 5-5.

FIG. 4 is a perspective view of conduit nut member 116, and FIG. 5 is a sectional view of conduit nut member 116 taken through line 5-5 (shown in FIG. 4). In the exemplary embodiment, conduit nut member 116 includes a head portion 138 and male threaded portion 124 extending axially from head portion 138 along longitudinal axis "A." Stepped bore 136 extends through conduit nut member 116 and is formed symmetrical about longitudinal axis "A." Stepped bore 136 includes an inner step 141 configured to engage threaded collar 110 (shown in FIGS. 2 and 3). Head portion 138 includes shoulder portion 134, and one or more slotted circumferential faces 140 and one or more continuous faces 142. Slotted circumferential faces 140 and continuous faces 142, combined, define tool engagement surfaces that extend substantially axially between shoulder portion 134 and a top surface 144 of conduit nut member 116, opposite shoulder portion 134. The tool engagement surfaces are configured in a hexagonal-shaped arrangement, although other configurations are contemplated. The tool engagement surfaces correspond to one or more tools, for example, and without limitation, a wrench and/or a socket. As such, the tool engagement surfaces facilitate tightening and/or loosening conduit nut member 116 using common hand tools, and without requiring use of a specialized tool.

In the exemplary embodiment, each slotted circumferential face 140 defines an axial slot 146. Each axial slot 146 extends generally axially along slotted circumferential face 140 between shoulder portion 134 and top surface 144 of conduit nut member 116, and has a circumferential width 148 sized to receive a spring finger 150 (shown in FIG. 6) of lock member 106 (shown in FIG. 6). This facilitates fixing lock member 106 rotationally with respect to conduit nut member 116 when axial slot 146 is aligned with spring finger 150. In particular, spring finger 150 snaps into axial slot 146 to facilitate coupling lock member 106 to conduit nut member 116. A top portion 152 of axial slot 146 tapers inward toward longitudinal axis "A" a predetermined distance 154 to define a ledge configured to receive an ear portion 156 of spring finger 150. This facilitates coupling lock member 106 to conduit nut member 116 about longitudinal axis "A".

In the exemplary embodiment, conduit nut member 116 includes two axial slots 146 disposed on diametrically-opposed slotted circumferential faces 140, i.e. on slotted circumferential faces 140 that are substantially parallel to each other and generally symmetrical with respect to longitudinal axis "A." In alternative embodiments, conduit nut member 116 includes fewer or greater than two axial slots 146, such that, for example, a respective axial slot 146 is circumferentially-positioned relative to a respective spring finger 150 of lock member 106.

In the exemplary embodiment, conduit nut member 116 is fabricated from a metal, for example, and without limitation, steel, aluminum, titanium, or a superalloy. Alternatively, conduit nut member 116 is fabricated from any material that enables conduit fastener assembly 100 to function as described herein, such as, for example, and without limitation, composite materials, resins, fiber reinforced resins, plastics, and fiber reinforced plastics.

Figure 6:
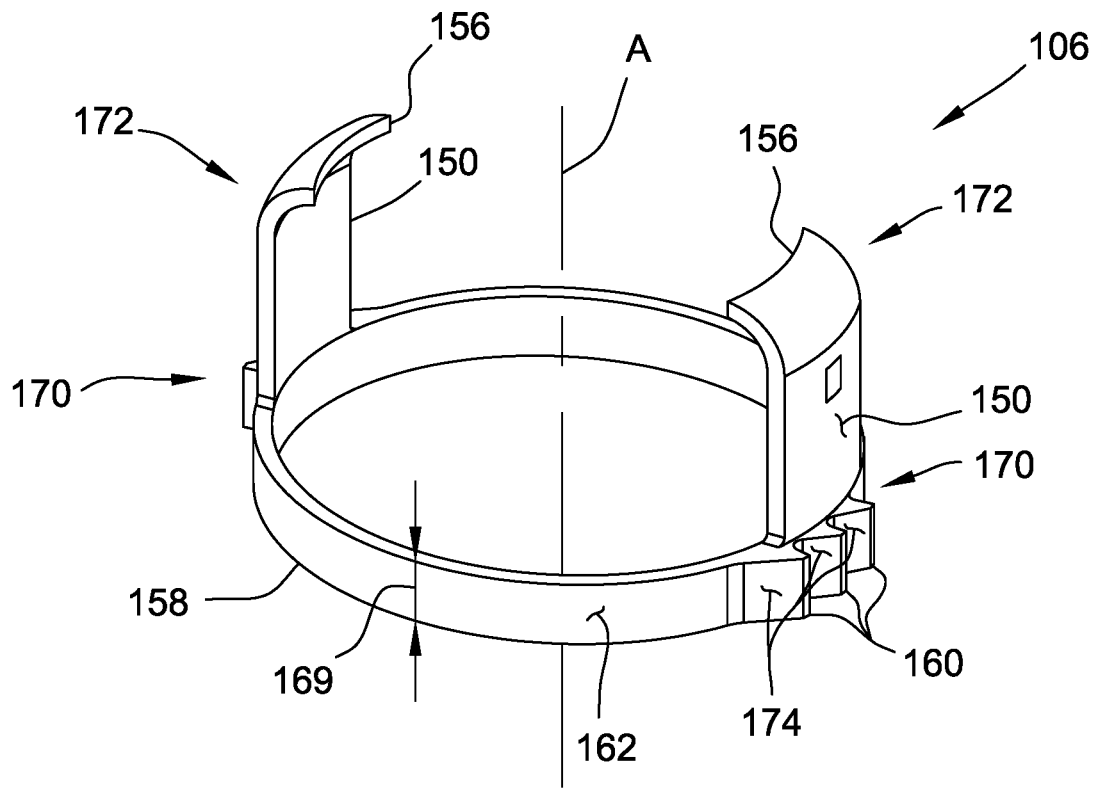
FIG. 6 is a perspective view of a lock member of the conduit fastener assembly of FIG. 1.
Figure 7:
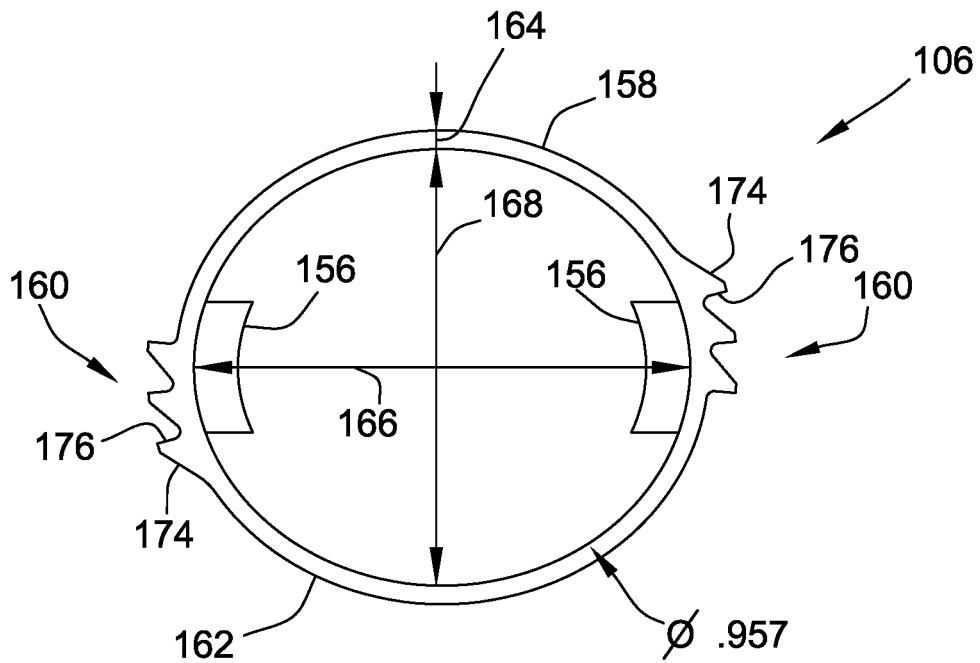
FIG. 7 is a bottom view of the lock member shown in FIG. 6.

FIG. 6 is a perspective view of lock member 106, and FIG. 7 is a bottom view of lock member 106. In the exemplary embodiment, lock member 106 includes a ring-shaped annular body 158 having one or more spring fingers 150 extending generally axially upward from annular body 158. Annular body 158 includes one or more radially-extending teeth 160 (broadly detent members) disposed on an outer surface 162 of annular body 158. In the exemplary embodiment, annular body 158 is a generally oval-shaped ring having a predetermined wall thickness 164, that when combined with an internal major axis length 166, facilitates fitting within an inner cavity diameter 196 (shown in FIG. 9) of lock washer 104 (shown in FIG. 9). Annular body 158 also has a predetermined internal minor axis length 168 that corresponds to a diameter of shoulder portion 134 of conduit nut member 116 to facilitate coupling lock member 106 to conduit nut member 116. In the exemplary embodiment, internal major axis length 166 is greater than internal minor axis length 168. Annular body 158 also has a height 169 that is shorter than a height 133 (shown in FIG. 5) of shoulder portion 134 of conduit nut member 116, such that lock member 106 remains able to be deflected or flexed, as described further herein, when should portion 134 applies an axial force against lock washer 104. Annular body 158 is deflectable, such that, in response to a radial force exerted thereon by one or more of spring fingers 150, annular body 158 is radially-deflected, becoming more or less circular based upon an amount of the radial force exerted on annular body 158.

It is contemplated that annular body 158 may have shapes other than oval, for example, and without limitation, annular body 158 may be round, ellipsoid, or any other suitable shape. In the exemplary embodiment, annular body 158 is fabricated from a resilient metallic material, such as a spring steel. Alternatively, annular body 158 is fabricated from any resilient material that enables lock member 106 to function as described herein, for example, and without limitation, resilient composite materials, resins, fiber reinforced resins, plastics, and fiber reinforced plastics.

In the exemplary embodiment, each spring finger 150 extends axially upward from annular body 158 from a fixed end 170 to a free end 172. Fixed end 170 is coupled to annular body 158. Free end 172 extends radially inward and define ear portion 156. As described herein, ear portion 156 is configured to extend radially over top portion 152 of axial slot 146 to facilitate retaining lock member 106 on conduit nut member 116 when coupled together. In one embodiment, free end 172 curves inward to form ear portion 156. Alternatively, free end 172 is bent and/or slanted radially inward to define ear portion 156, or otherwise extends radially-inward in any manner that enables lock member 106 to function described herein. In the exemplary embodiment, each spring finger 150 is formed substantially the same. While lock member 106 is described with two spring fingers 150, in alternative embodiments, lock member 106 includes fewer or greater than two spring fingers 150, such that, for example, a respective spring finger 150 is circumferentially-positioned relative to a respective axial slot 146 of conduit nut member 116.

As described above, one or more radially-extending teeth 160 (or detent members) are disposed on outer surface 162 of annular body 158. In particular, in the exemplary embodiment, sets of three adjacent radially-extending teeth 160 are disposed on annular body 158 with each set generally circumferentially aligned relative to a respective spring finger 150. Each tooth 160 includes a sliding surface 174 and a securing surface 176. Sliding surface 174 and securing surface 176 are sized and shaped to correspond to a sliding surface 182 (shown in FIG. 9) and a securing surface 184, respectively, of notches 180 (shown in FIG. 9) of lock washer 104 (shown in FIG. 9). In the exemplary embodiment, teeth 160 are configured to facilitate preventing rotation that affects loosening of conduit nut member 116 with respect to lock washer 104, for example, in a counter-clockwise direction. Alternatively, teeth 160 are configured to facilitate preventing rotation of conduit nut member 116 in the clockwise direction, or both the counter-clockwise and the clockwise directions. While lock member 106 is described with three teeth 160 formed proximate spring finger 150, in alternative embodiments, lock member 106 includes fewer or greater than three teeth 160.

Figure 8:
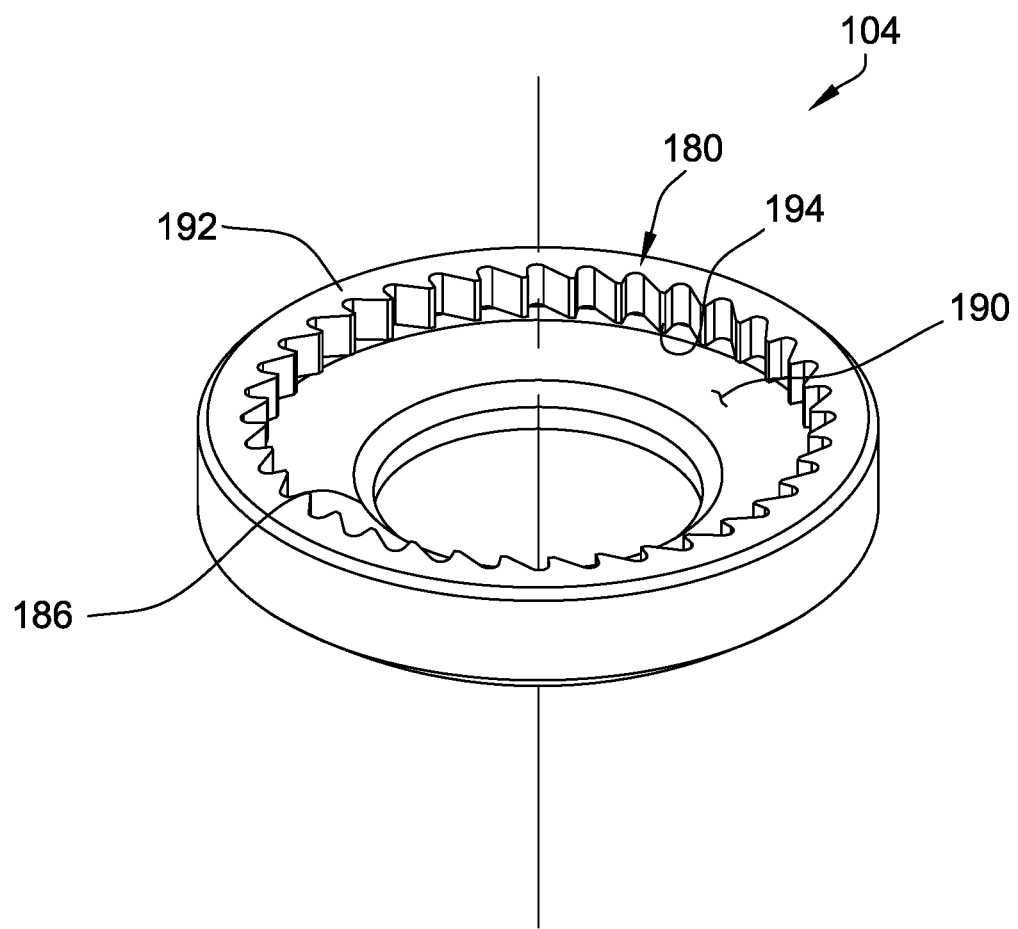
FIG. 8 is a perspective view of a lock washer of the conduit fastener assembly of FIG. 1.
Figure 9:
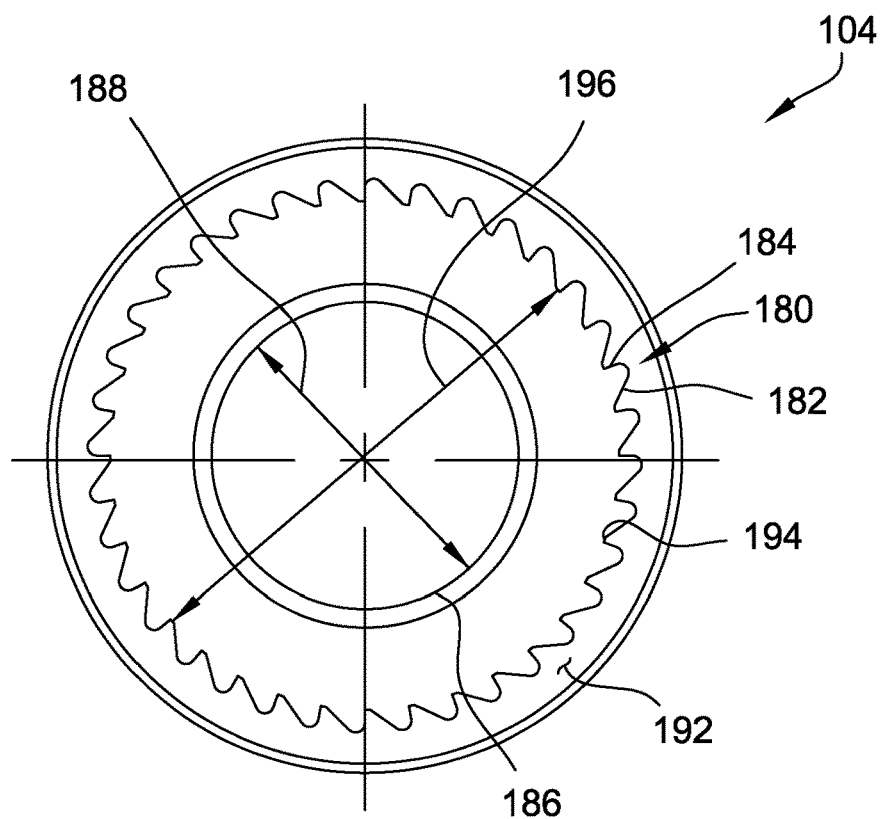
FIG. 9 is a top view of the lock washer shown in FIG. 8.
Figure 10:
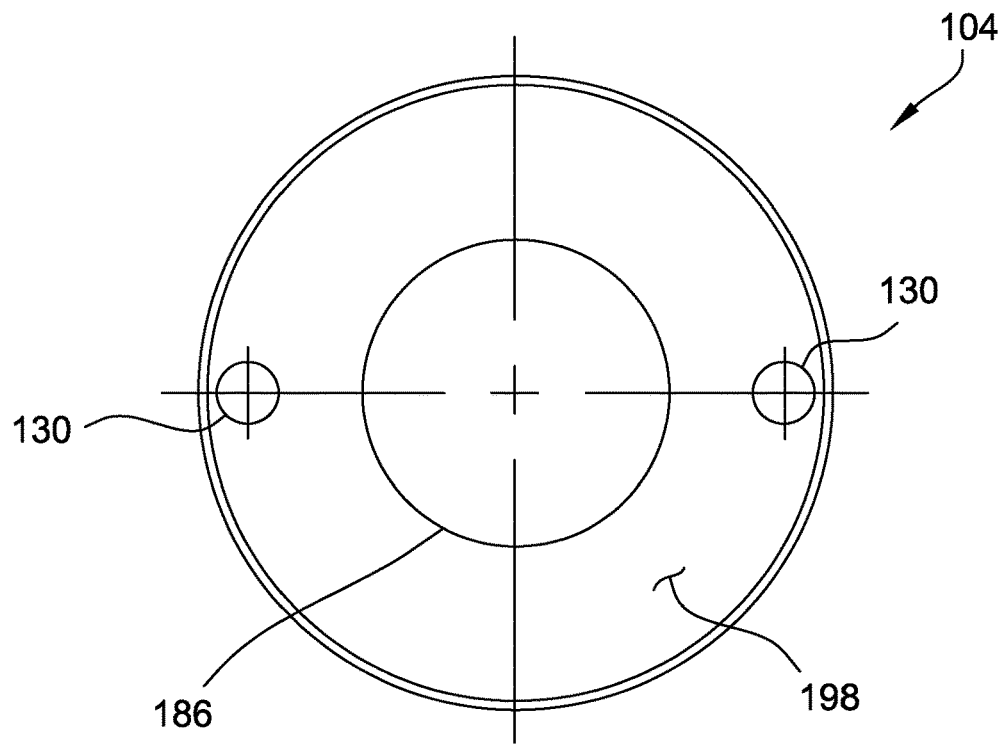
FIG. 10 is a bottom view of the lock washer shown in FIG. 8.

FIG. 8 is a perspective view of lock washer 104, FIG. 9 is a top view of lock washer 104, and FIG. 10 is a bottom view of lock washer 104. In the exemplary embodiment, lock washer 104 includes an axial aperture 186 that extends through lock washer 104. Axial aperture 186 is sized to facilitate freely sliding male threaded portion 124 of conduit nut member 116 therethrough. As such, axial aperture 186 has a diameter 188 slightly greater than an outer diameter of male threaded portion 124. Lock washer 104 also includes a central portion 190 surrounding axial aperture 186 and configured to contact bottom surface 132 (shown in FIG. 5) of conduit nut member 116 in face-to-face contact.

A circumferential wall 192 extends axially-upward from central portion 190 about a periphery of lock washer 104. Circumferential wall 192 has a radially-inner surface 194 that defines inner cavity diameter 196 of lock washer 104, as described above. Inner cavity diameter 196 is sized to receive annular body 158 of lock member 106 therein. Circumferential wall 192 has a plurality of notches 180, or locking teeth, defined in radially-inner surface 194 of circumferential wall 192. In the exemplary embodiment, each notch 180 is defined by sliding surface 182, securing surface 184, and radially-inner surface 194, and is configured to correspond to sliding surface 174 and securing surface 176, respectively, of a respective tooth 160. In particular, securing surface 184 is substantially orthogonal to radially-inner surface 194 and configured to contact securing surface 176 of tooth 160 in face-to-face contact. Sliding surface 182 is formed oblique to radially-inner surface 194 configured to contact sliding surface 174 of tooth 160 in face-to-face contact.

As shown in FIG. 10, lock washer 104 includes one or more lock washer holes 130 configured to receive a respective anti-rotation member 118. In the exemplary embodiment, lock washer hole 130 is a blind hole formed in a bottom surface 198 of lock washer 104. Alternatively, lock washer hole 130 could be formed through lock washer 104. In the exemplary embodiment, lock washer 104 includes two diametrically-opposed lock washer holes 130. Alternatively, lock washer 104 includes fewer or greater than two lock washer holes 130.

In the exemplary embodiment, lock washer 104 is fabricated from a metal, for example, and without limitation, steel, aluminum, titanium, or a superalloy. Alternatively, lock washer 104 is fabricated from any material that enables conduit fastener assembly 100 to function as described herein, such as, for example, and without limitation, composite materials, resins, fiber reinforced resins, plastics, and fiber reinforced plastics.

In operation, with reference to FIG. 2, in first orientation 102, lock washer 104, lock member 106, and conduit nut member 116 are fixed axially and rotationally relative to fitting body 122. In second orientation 108 shown in FIG. 3, lock member 106 and conduit nut member 116 are rotationally free relative to fitting body 122. Rotation of conduit nut member 116 relative to fitting body 122 displaces conduit nut member 116 and lock member 106 axially relative to fitting body 122, facilitating axial displacement of lock washer 104 relative to fitting body 122.

In first orientation 102, anti-rotation members 118 are disposed in fitting body holes 128 and corresponding lock washer holes 130 to facilitate rotationally-fixing lock washer 104 relative to fitting body 122. The oval shape of annular body 158 (shown in FIG. 6) facilitates urging radially-extending teeth 160, positioned generally circumferentially aligned relative to a respective spring finger 150, radially-outward and into contact with notches 180 of lock washer 104. In particular, one or more of sliding surfaces 174 and securing surfaces 176 (shown in FIG. 7) of radially-extending teeth 160 are urged into face-to-face contact with sliding surfaces 182 and securing surfaces 184 (shown in FIG. 9), respectively, of notches 180, rotationally fixing lock member 106 relative to lock washer 104.

As shown in FIG. 2, in first orientation 102, free end 172 of spring finger 150 seats within top portion 152 of axial slot 146 of conduit nut member 116. Seating free end 172 of spring finger 150 in top portion 152 of axial slot 146 facilitates rotationally-fixing lock member 106 with conduit nut member 116. As such, lock member 106 and conduit nut member 116 are caused to rotate together. Consequently, when one or more radially-extending teeth 160 of lock member 106 seats against one or more notches 180 of lock washer 104, lock member 106 becomes rotationally-fixed relative to lock washer 104, causing conduit nut member 116 to become rotationally-fixed relative to lock washer 104 and fitting body 122.

As described above, bias component 120 is disposed between lock washer 104 and fitting body 122 to facilitate biasing lock washer 104 upward against conduit nut member 116 to facilitate maintaining locking engagement of radially-extending teeth 160 and notches 180. Lock member 106 is captured between conduit nut member 116 and lock washer 104, and in particular, about shoulder portion 134 (shown in FIG. 5) of conduit nut member 116. Because height 169 (shown in FIG. 6) of annular body 158 is shorter than height 133 (shown in FIG. 5) of shoulder portion 134 of conduit nut member 116, lock member 106 can be deflected or flexed as described herein.

In second orientation 108, each spring finger 150 is displaced radially inward to facilitate deflecting annular body 158 (shown in FIG. 6) to disengage radially-extending teeth 160 from notch 180 of lock washer 104. In particular, displacing fixed end 170 (shown in FIG. 6) of spring finger 150 radially inward facilitates disengaging one or more of sliding surfaces 174 and securing surfaces 176 (shown in FIG. 7) of radially-extending teeth 160 from face-to-face contact with sliding surfaces 182 and securing surfaces 184 (shown in FIG. 9), respectively, of notches 180 to facilitate rotation of conduit nut member 116 and lock member 106 relative to lock washer 104.

To facilitate displacing spring fingers 150 radially inward, as described herein, a tool (not shown), such as a conventional socket or wrench, is coupled to conduit nut member 116. The tool is axially displaced relative to conduit nut member 116 where it contacts free end 172 of spring fingers 150. As described above, free end 172 curves inward to form ear portion 156 (shown in FIG. 6). As the tool contacts ear portion 156, spring fingers 150 are radially displaced, facilitating deflecting annular body 158 such that radially-extending teeth 160 are disengaged from notches 180. The tool may be rotated either clockwise or counterclockwise about longitudinal axis "A" to displace conduit nut member 116 axially in either direction along longitudinal axis "A," tightening conduit nut member 116 or loosening conduit nut member 116 as appropriate. Thus, when a tool such as a conventional socket or wrench is applied to conduit nut member 116, lock member 106 is deflected radially inward such that teeth 160 of lock member 106 disengage notches 180 of lock washer 104, thereby allowing rotation of lock member 106 and conduit nut member 116 relative to lock washer 104 and fitting body 122.

Figure 11:
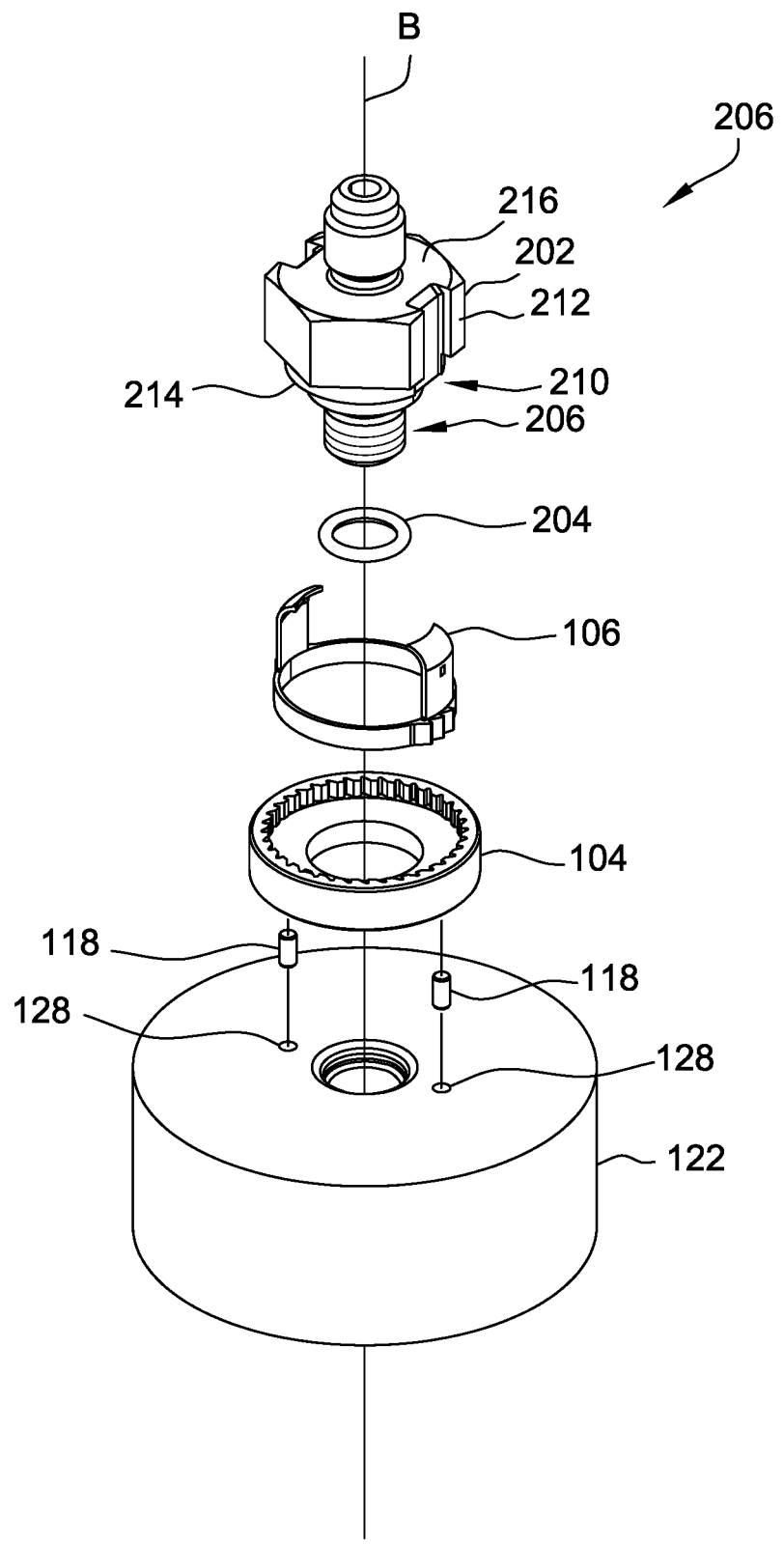
FIG. 11 is an exploded perspective view of an alternative conduit fastener assembly.
Figure 12:
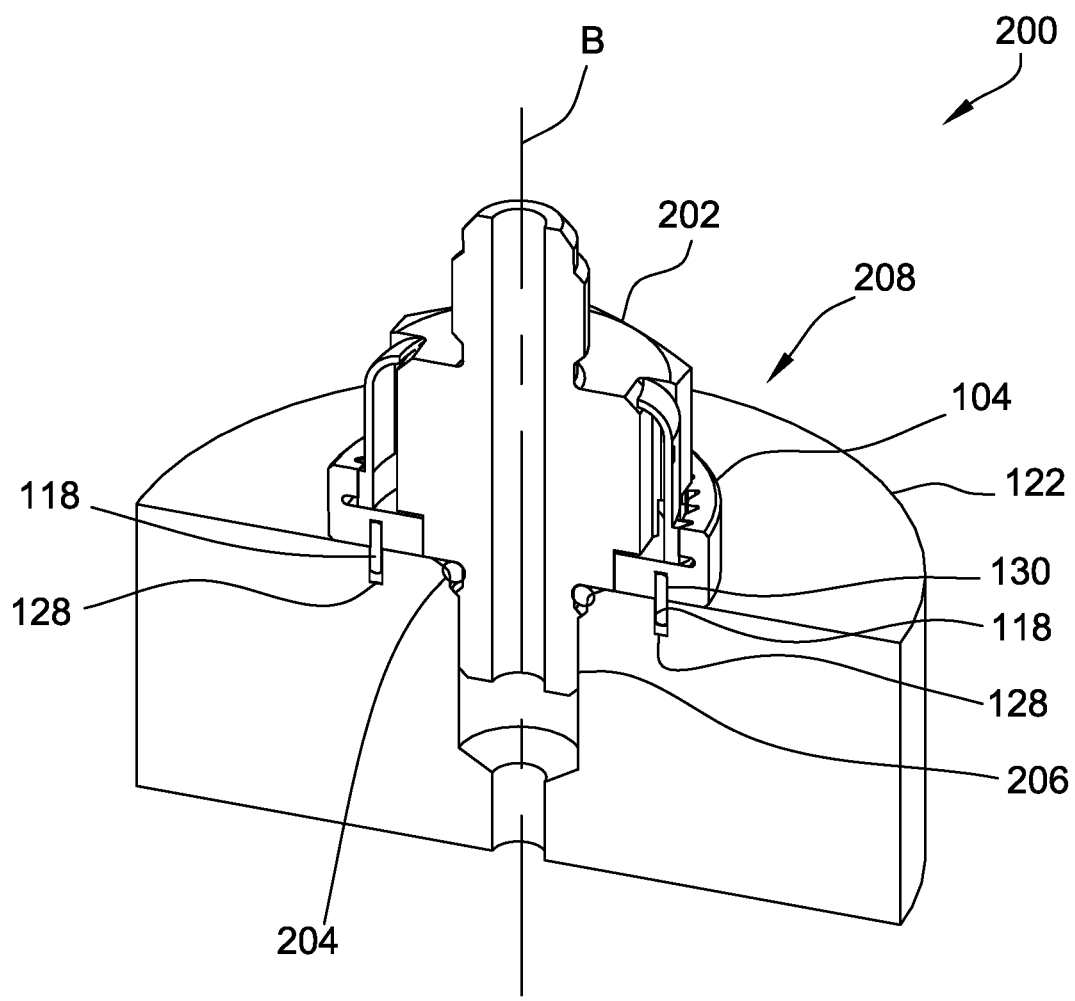
FIG. 12 is a sectional perspective view of the conduit fastener assembly shown in FIG. 11 in a locked orientation, including a lock washer engaged with a lock member and rotationally fixed with respect to a fitting body.

FIG. 11 is an exploded perspective view of an alternative conduit fastener assembly 200. FIG. 12 is a sectional perspective view of conduit fastener assembly 200 in a locked orientation 208, showing lock member 106 engaged with lock washer 104 and rotationally fixed with respect to a fitting body 122. In the exemplary embodiment, conduit fastener assembly 200 is similar to conduit fastener assembly 100 (shown in FIG. 1) and includes lock member 106, lock washer 104, and anti-rotation members 118. In the exemplary embodiment, conduit fastener assembly 200 is a male-to-male adapter or coupling and includes a conduit nut member 202 and a seal member 204.

In the exemplary embodiment, conduit nut member 202 includes a male threaded portion 206 that extends axially along a longitudinal axis "B." Male threaded portion 206 is configured to engage a female threaded portion 126 of fitting body 122. As shown in FIG. 12, lock washer 104 is rotationally locked with respect to fitting body 122 by use of anti-rotation members 118. In particular, each anti-rotation member 118 engages fitting body hole 128 and corresponding lock washer hole 130. While conduit fastener assembly 200 is depicted with two anti-rotation members 118, it is contemplated that conduit fastener assembly 200 can include fewer or greater than two anti-rotation members 118. In the exemplary embodiment, anti-rotation members 118 are pins. Alternatively, anti-rotation members 118 can be any type of anti-rotation members that enables conduit fastener assembly 200 to function as described herein.

In the exemplary embodiment, lock washer 104 is coupled against fitting body 122, and seal member 204 provides a sealing surface, in particular a fluid seal, between fitting body 122 and conduit nut member 202. As such, unlike conduit fastener assembly 100, conduit fastener assembly 200 does not include bias component 120. Conduit nut member 202 includes one or more axial slots 210 that extend generally axially along a slotted circumferential face 212 between a shoulder portion 214 and a top surface 216 of conduit nut member 202. Each axial slot 210 is formed substantially the same as axial slot 146, described above. As shown in FIG. 12, the rotational fixing of conduit nut member 202 is substantially the same as described above for conduit fastener assembly 100, with respect to FIGS. 2 and 3.

Figure 13:
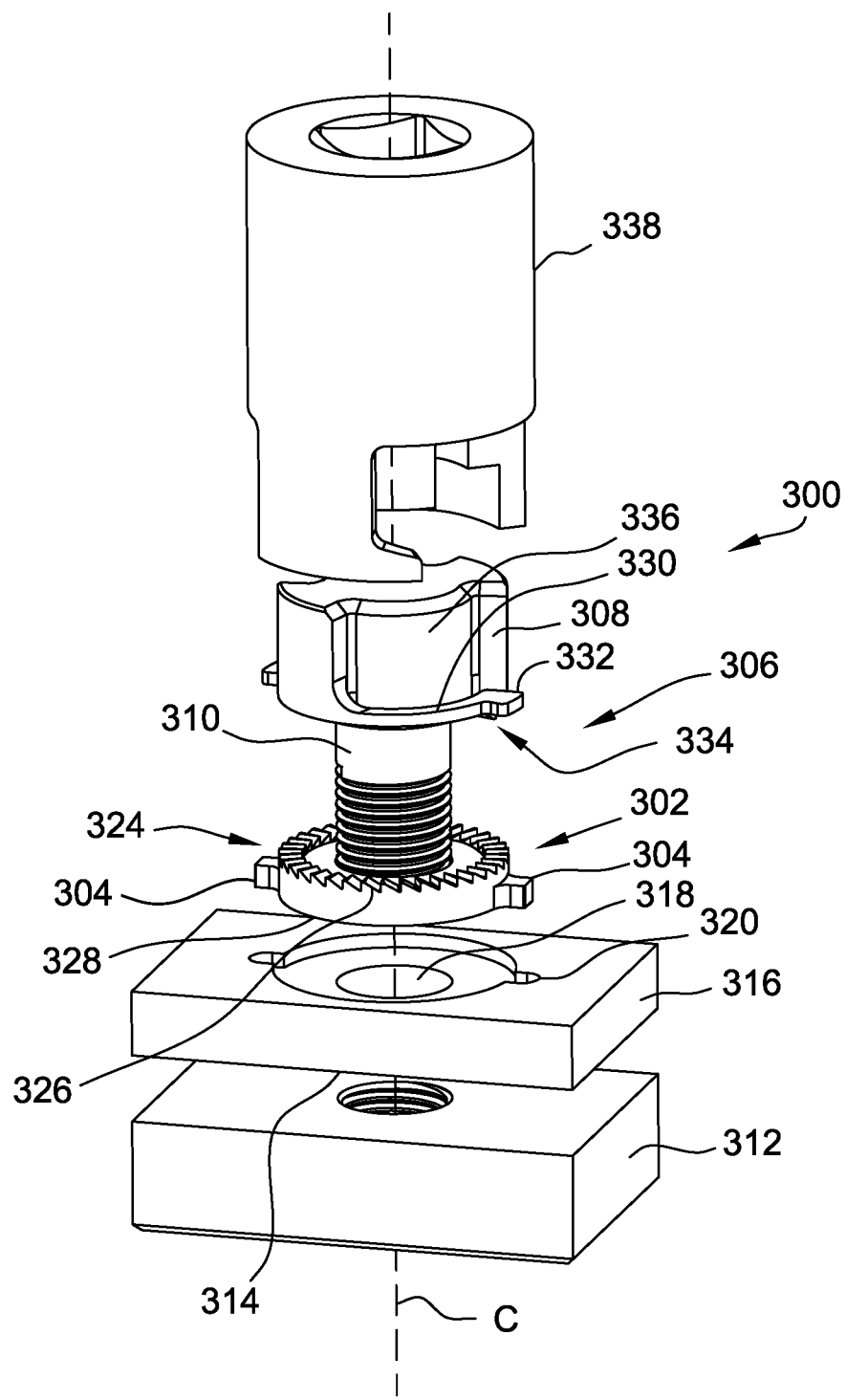
FIG. 13 is an exploded view of an alternative embodiment of a axially-locking fastener device, including a lock washer with one or more radial lock tabs.
Figure 14:
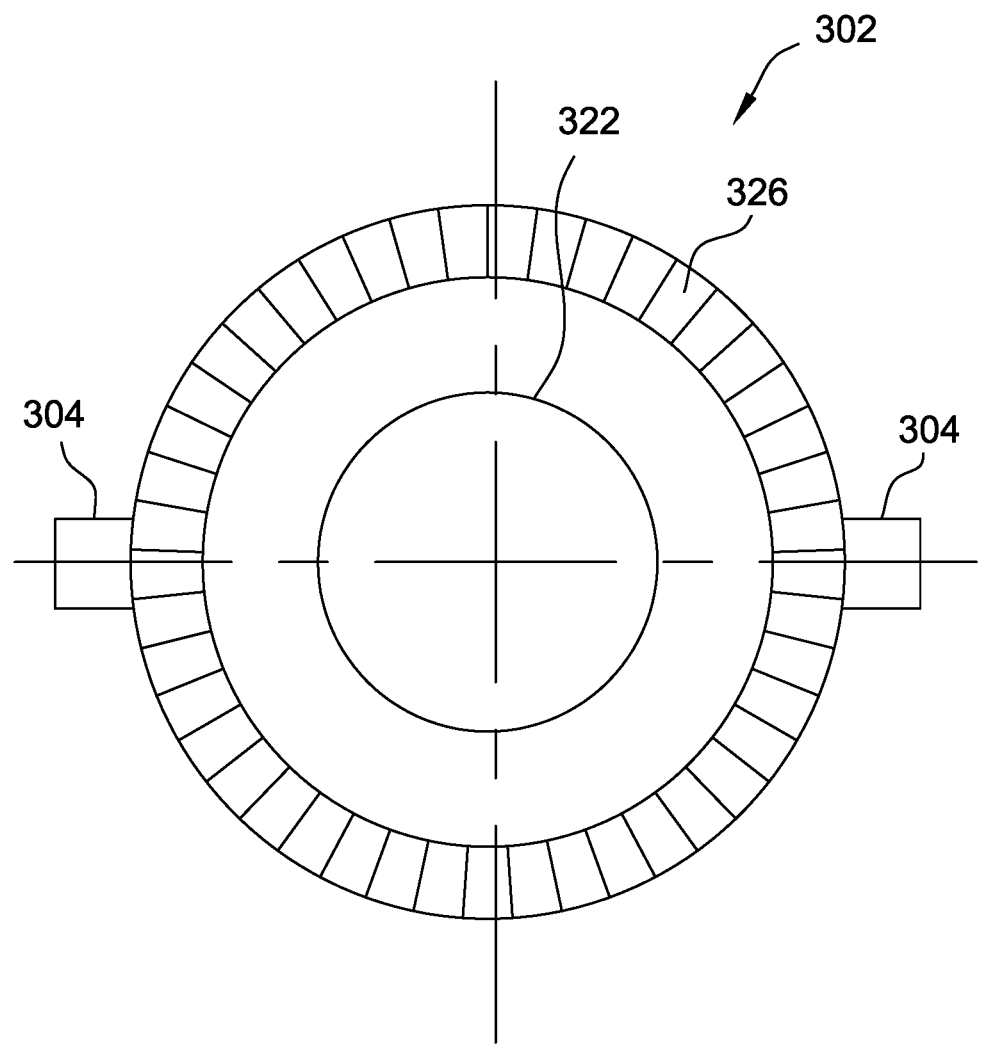
FIG. 14 is a top view of the lock washer shown in FIG. 13.

FIG. 13 is an exploded view of an alternative exemplary embodiment of an axially-locking fastener device 300, including a lock washer 302 with a radial lock tab 304. FIG. 14 is a top view of lock washer 302. In the exemplary embodiment, fastener device 300 includes a fastener 306 with a head portion 308 and an elongated threaded body portion 310 extending axially from head portion 308. Fastener 306 is configured to threadably couple to a first substrate member 312. First substrate member 312 includes a female threaded segment 314 formed therein and disposed opposite head portion 308 of fastener 306. A second substrate member 316 is axially interposed between first substrate member 312 and head portion 308 of fastener 306.

Second substrate member 316 includes an aperture 318 defined therethrough and a recess 320 disposed radially outward of aperture 318. In the exemplary embodiment, fastener 306 is, for example, and without limitation, a bolt, a tapered screw, or any other type of fastener that enables fastener device 300 to function as described herein.

As described above, fastening device 300 also includes lock washer 302. In the exemplary embodiment, lock washer 302 includes an axial aperture 322 defined therethrough and one or more lock tabs 304 extending from lock washer 302. In particular, with reference to FIGS. 13 and 14, lock washer 302 has a first surface 324 with a plurality of lock teeth 326 extending axially about a periphery of lock washer 302, and an opposite second surface 328. Lock tabs 304 extend radially from lock washer 302 and coplanar with second surface 328. Lock tabs 304 are configured to be received within recess 320 of second substrate member 316. Fastener 306 is configured to extend through axial aperture 322 of lock washer 302 such that threaded body portion 310 is threadably engaged with female threaded segment 314 of first substrate member 312.

In the exemplary embodiment, fastener 306 and lock washer 302 are configured to couple together to form a locking mechanism for fastening device 300. In particular, head portion 308 of fastener 306 includes one or more pawl arms 330. Pawl arm 330 includes a flange 332 extending radially outward from pawl arm 330 and respective pawl teeth 334 for engagement with at least one of lock teeth 326. Head portion 308 includes one or more axially extending recessed portions 336. Pawl teeth 334 are configured to intermesh with the lock teeth 326 of the lock washer 302. A tool 338 may be used to attach fastening device 300 to substrate member 312. In the illustrated exemplary embodiment the locking mechanism of fastening device 300 is an axially locking mechanism having lock teeth 326 that axially oppose pawl teeth 334 relative to a fastener axis "C."

Figure 15:
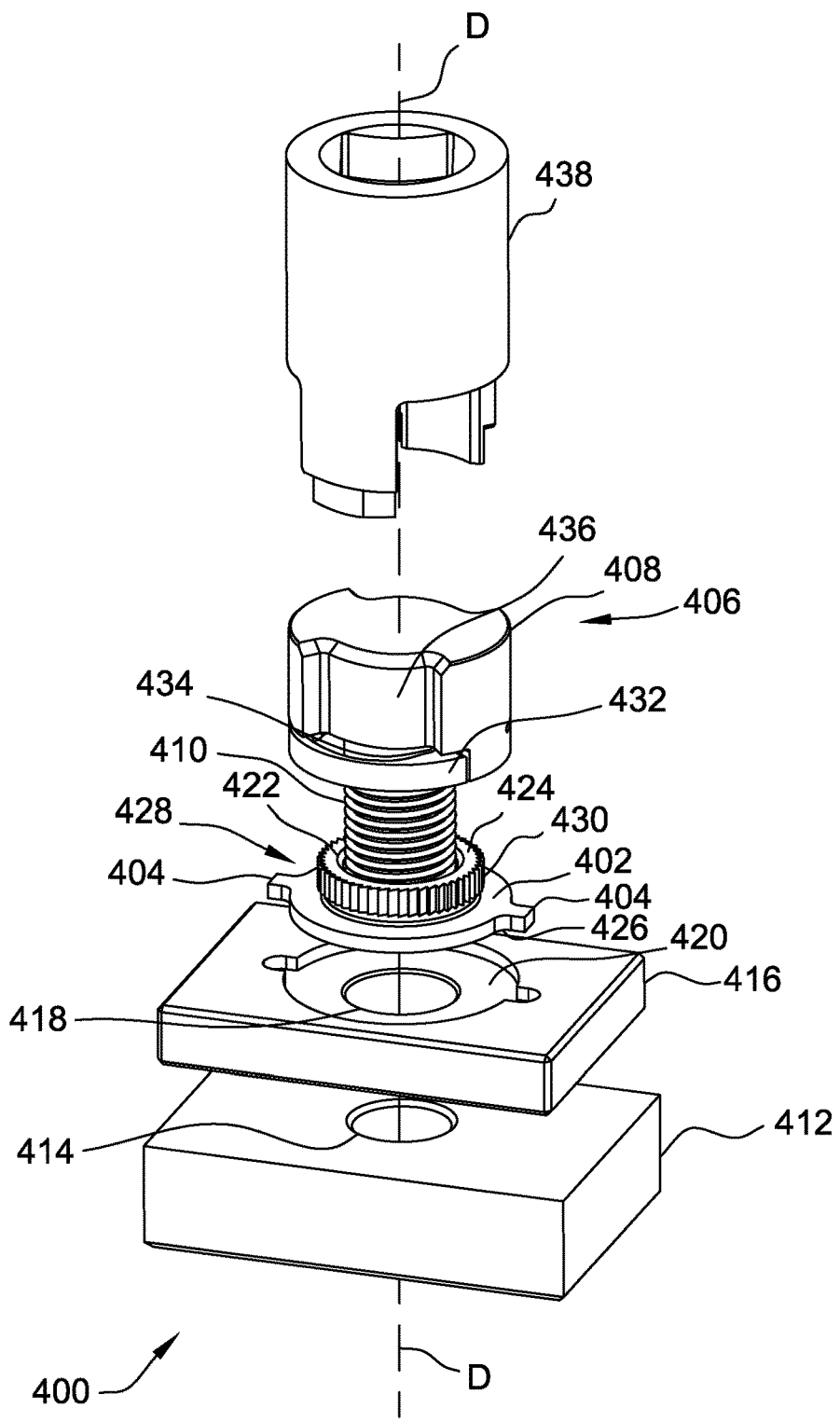
FIG. 15 is an exploded view of an alternative embodiment of a radially-locking fastener device, including a lock washer and one or more radial lock tabs.

FIG. 15 is an exploded view of another alternative embodiment of an axially-locking fastener device 400, including a lock washer 402 with one or more radial lock tabs 404. In the exemplary embodiment, fastening device 400 is similar to fastening device 300 (shown in FIG. 13), and additionally includes a radial locking mechanism. Fastener device 400 includes a fastener 406 with a head portion 408 and an elongated threaded body portion 410 extending axially from head portion 408. Fastener 406 is configured to threadably couple to a first substrate member 412. First substrate member 412 includes a female threaded segment 414 formed therein and disposed opposite head portion 408 of fastener 406. A second substrate member 416 is axially interposed between first substrate member 412 and head portion 408 of fastener 406. Second substrate member 416 includes an aperture 418 defined therethrough and a recess 420 disposed radially outward of aperture 418.

In the exemplary embodiment, lock washer 402 includes an axial aperture 422 defined therethrough and one or more lock tabs 404 extending from lock washer 402. In particular, lock washer 402 has a first surface 424, an opposite second surface 426, and a circumferential surface 428 therebetween. Circumferential surface 428 has an array of lock teeth 430 extending radially outward from circumferential surface 428. Lock tabs 404 extend radially from lock washer 402 and coplanar with second surface 426. Lock tabs 404 are configured to be received within recess 420 of second substrate member 416. Fastener 406 is configured to extend through axial aperture 422 of lock washer 402 such that threaded body portion 410 is threadably engaged with female threaded segment 414 of first substrate member 412.

In the exemplary embodiment, fastener 406 and lock washer 402 are configured to couple together to form a radial locking mechanism for fastening device 400. In particular, head portion 408 of fastener 406 includes one or more pawl arms 432. Pawl arm 432 includes one or more pawl teeth 434 for engagement with at least one of lock teeth 430. Head portion 408 includes one or more axially extending recessed portions 436. Pawl teeth 434 are configured to intermesh with the lock teeth 430 of lock washer 402. A tool 438 may be used to attach fastening device 400 to substrate member 412. In the illustrated exemplary embodiment the locking mechanism of fastening device 400 is a radial locking mechanism having lock teeth 430 that radially oppose pawl teeth 434 relative to a fastener axis "D."

Figure 16:
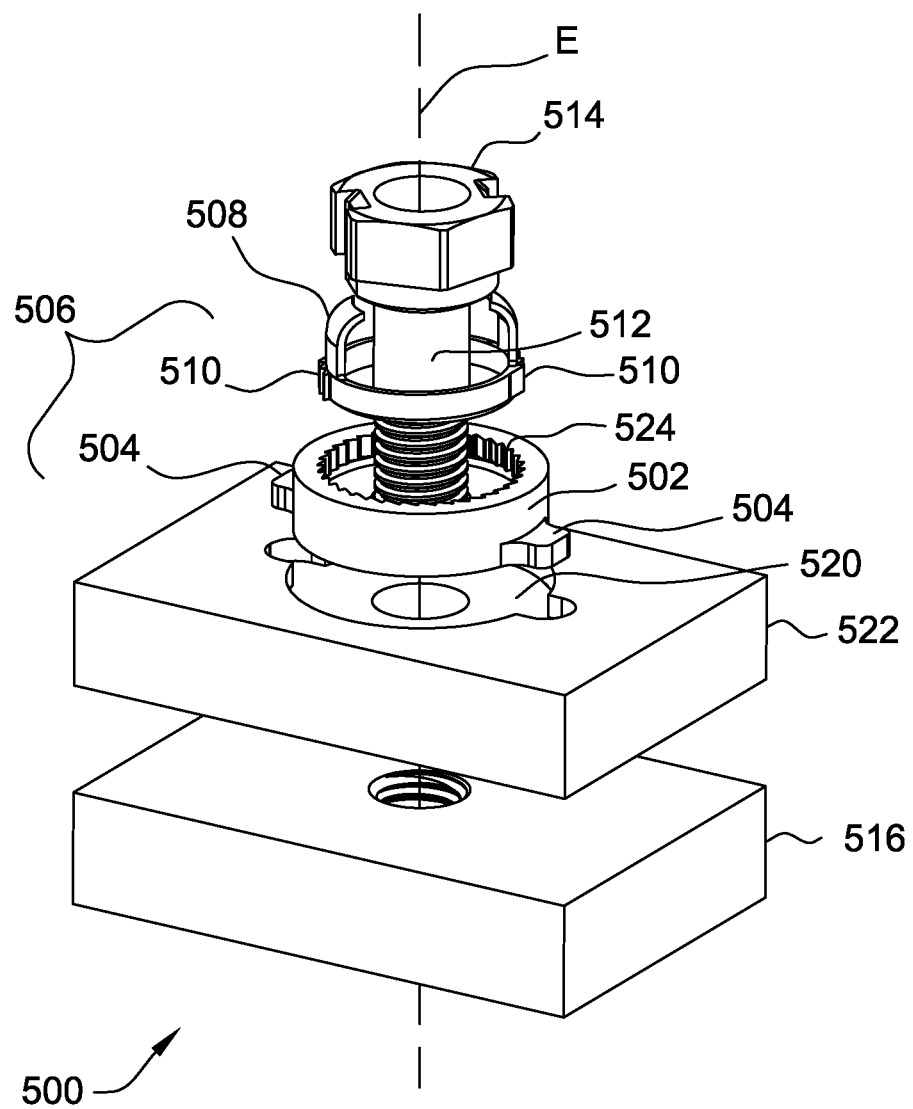
FIG. 16 is an exploded view of another alternative embodiment of a radially-locking fastener device, including a lock washer with one or more radial lock tabs and a locking mechanism with a radial lock member.
Figure 17:
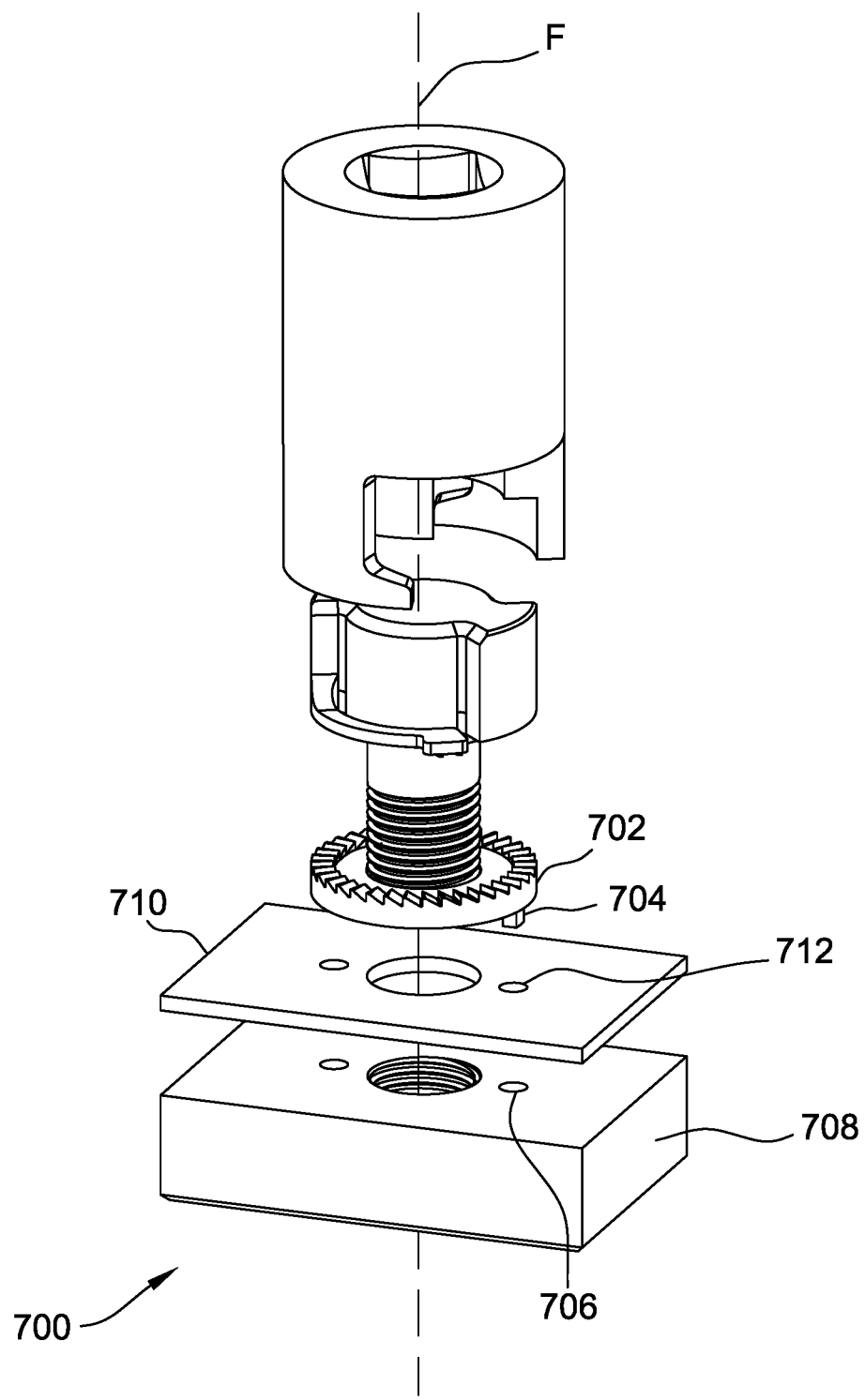
FIG. 17 is an exploded view of another axially-locking fastener device, including a lock washer with one or more axial lock tabs.

FIG. 16 is an exploded view of another alternative embodiment of a radially-locking fastener device 500, including a lock washer 502 with one or more lock tabs 504 and a locking mechanism 506 with radial lock member 508. In the exemplary embodiment, lock washer 502 is substantially similar to lock washer 104 (shown in FIG. 1), including lock tabs 504. Lock tabs 504 extend radially from lock washer 502 substantially the same as described above with reference to lock washer 302 (shown in FIG. 13) and lock washer 402 (shown in FIG. 15). Lock tabs 504 are configured to be received within a recess 520 of a second substrate member 522.

Fastener device 500 includes lock member 508, which is formed substantially the same as lock member 106 (shown in FIG. 1). In the exemplary embodiment, lock member 508 includes one or more teeth 510 extending radially outward relative to an axis "E" of fastener device 500. Teeth 510 are configured to intermesh with one or more lock teeth 524 of lock washer 502. Fastener device 500 also includes a fastener 512 having a head portion 514 configured to couple to lock member 508. In such an embodiment, head portion 514 abuts lock washer 502.

Figure 18:
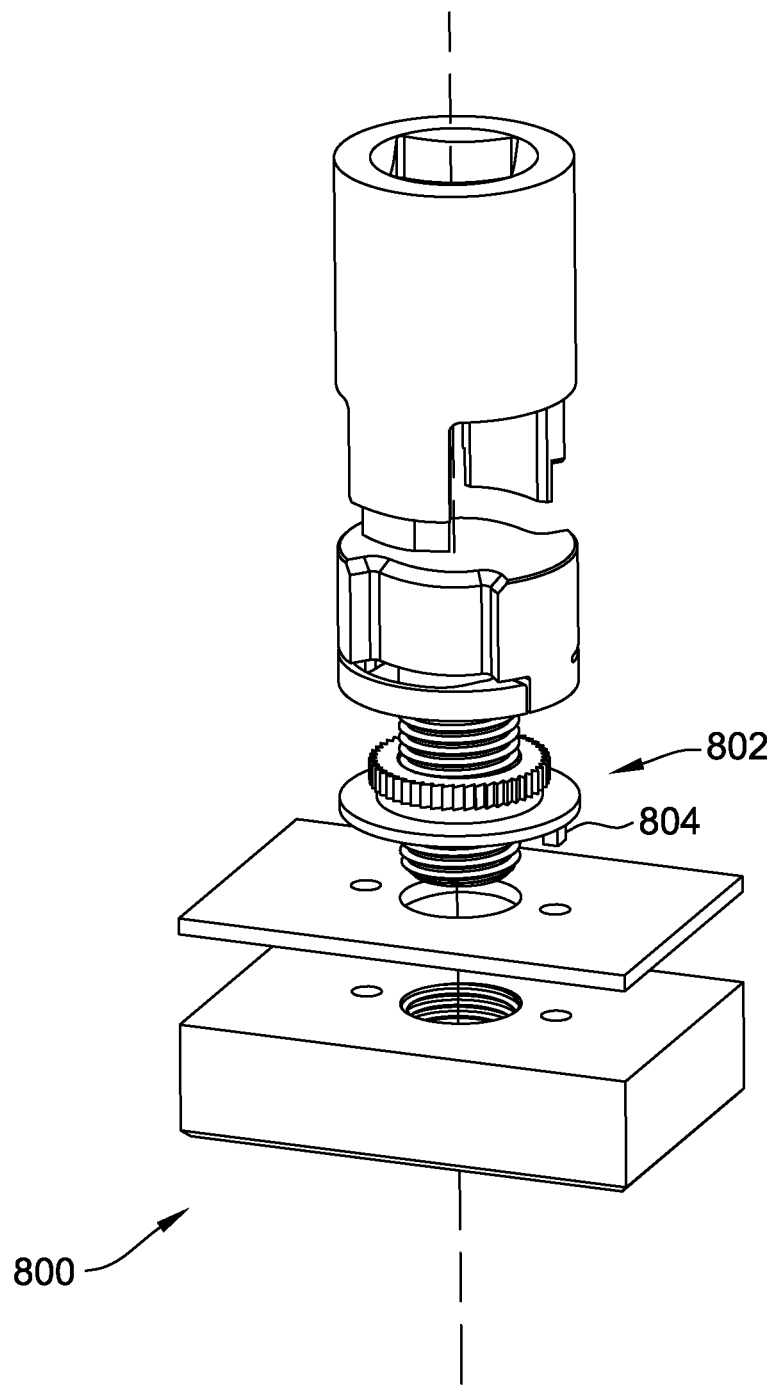
FIG. 18 is an exploded view of another radially-locking fastener device, including a lock washer with one or more axial lock tabs.

FIG. 18 is an exploded view of another embodiment of a fastener device 700, showing a lock washer 702 with one or more axial lock tabs 704. In the exemplary embodiment, fastening device 700 is similar to fastening device 300 (shown in FIG. 3), but with lock washer 702 including one or more axial lock tabs 704. As shown in FIG. 18, lock tab 704 is an axially-extending lock tab, extending substantially parallel to a fastener axis "F." Lock tab 704 is substantially similar to anti-rotation members 118 (shown in FIG. 1) and may include, for example, and without limitation, a pin, a key, a lug, or any other suitably shaped protrusion configured to seat within a recess 706 formed in a substrate member 708. Recess 706 can be a blind hole or a through hole configured to receive lock tab 704. In some embodiments, a second substrate 710 may be included. In such an embodiment, second substrate 710 may include a through hole recess 712 that is aligned with recess 706. As such, lock tab 704 may extend through second substrate 710 and into substrate 706. With reference to FIG. 19, a fastening device 800 is shown. Fastening device 800 is similar to fastening device 400 (shown in FIG. 15), but with lock washer 802 including one or more axial lock tabs 804, substantially similar to lock washer 702 (shown in FIG. 18).

The fastener components as described herein provide locking and vibration resistant fastener assemblies. For example, as described in the embodiments herein, when a tool is removed from the associated fastener assembly, teeth on the lock member, fastener, and/or nut member engage the notches of the respective lock washer. When the teeth are engaged, the fastener and/or nut member is rotationally locked due to the rotational locking relationship of the lock washer to the lock member. When the tool is applied to the conduit nut member, the lock member is displaced to disengage the teeth from the notches. When the teeth are disengaged from the lock washer notches, the fastener and/or nut member is rotationally free relative to the lock washer and the fitting body.

Exemplary embodiments of systems and methods for rotationally locked conduit fastener assemblies are described above. The systems and methods are not limited to the specific embodiments described herein but, rather, components of the systems and/or operations of the methods may be utilized independently and separately from other components and/or operations described herein. Further, the described components and/or operations may also be defined in, or used in combination with, other systems, methods, and/or devices, and are not limited to practice with only the systems described herein.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A fastener assembly comprising:
a lockable member defining a longitudinal axis;
a lock member coupled to said lockable member, said lock member comprising a detent member; and
a lock washer comprising an axial aperture defined therethrough, a plurality of notches defined therein, and at least one lock tab extending radially outward from said lock washer, said at least one lock tab configured to be received within a recess defined in a substrate member to rotationally fix said lock member relative to the substrate member, each notch of said plurality of notches is configured to receive said detent member, wherein engagement of said detent member with said plurality of notches prevents rotation of said lockable member relative to the lock washer in a first rotational direction about the longitudinal axis, and wherein said lock member is positionable between a locked configuration in which said detent member is configured to engage said plurality of notches, and an unlocked configuration in which said detent member is spaced from said plurality of notches.

2. A fastener assembly in accordance with claim 1, wherein said lockable member and said lock member are a single piece, said lockable member including a head, said lock member comprising at least one pawl arm extending from said head and including said detent member extending therefrom.

3. A fastener assembly in accordance with claim 2, wherein said head of said lockable member includes an axially extending recessed portion configured to receive a tool therein such that the tool contacts said at least one pawl arm to switch said lock washer to the unlocked configuration.

4. A fastener assembly in accordance with claim 1, wherein said lock member is releasably coupled to said lockable member, said lock member comprising an annular body and an axially-extending spring finger coupled to said annular body, said axially-extending spring finger comprising a free end extending radially inward relative to said annular body, said annular body comprising said detent member extending radially outward and circumferentially aligned with said axially- extending spring finger.

5. A fastener assembly in accordance with claim 1, where said lock washer comprises a first surface, an opposite second surface, and at least one circumferential surface therebetween, wherein said at least one lock tab is coplanar with said second surface.

6. A fastener assembly in accordance with claim 1, wherein said at least one lock tab comprises two diametrically opposed lock tabs.

7. A fastener assembly in accordance with claim 1, wherein said lock washer has a first surface and an opposite second surface, said first surface comprising said plurality of notches extending axially about a periphery of said lock washer.

8. A fastener assembly in accordance with claim 7, wherein said lockable member and said lock member are a single piece, said lock member comprising a pawl arm comprising said detent member extending axially therefrom to engage said plurality of notches when said lock member is in the locked configuration and a flange extending radially outward.

9. A fastener assembly in accordance with claim 1, wherein said lock washer comprises a first surface, an opposite second surface, and a circumferential surface therebetween, said circumferential surface comprises said plurality of notches extending radially outward.

10. A fastener assembly in accordance with claim 9, wherein said lockable member and said lock member are a single piece, said lock member comprising a pawl arm comprising said detent member extending radially inward therefrom to engage said plurality of notches when said lock member is in the locked configuration.

11. A fastener assembly in accordance with claim 1, wherein said lock washer comprises a central portion and a circumferential wall extending axially upward from the central portion and about a periphery of said lock washer, wherein said circumferential wall comprises a radially-inner surface comprising a plurality of notches.

12. A fastener assembly in accordance with claim 11, wherein said lockable member comprises a fastener member comprising a head portion and an enlongated threaded body portion.

13. A fastener assembly in accordance with claim 11, wherein said lockable member comprises a conduit nut member.

14. A fastener assembly in accordance with claim 11, wherein said lock member is releasably coupled to said lockable member, said lock member comprising an annular body and an axially-extending spring finger coupled to said annular body, said axially-extending spring finger comprising a free end that extends radially inward relative to said annular body, said annular body comprising said detent member extending radially outward and circumferentially aligned relative to said axially-extending spring finger, wherein in the locked configuration, said detent member engages a radially-extending notch of said plurality of radially-extending notches such that said lockable member is rotationally fixed relative to said lock washer.

15. A fastener assembly in accordance with claim 14, wherein said annular body is positionable between the locked configuration in which said detent member is in a radially outward position, and the unlocked configuration in which said detent member is in a radially inward position.

16. A fastener assembly in accordance with claim 15, wherein said lockable member comprises a peripheral surface comprising an axially-extending slot defined therein, and wherein said axially extending spring finger at least partially engages the axially-extending slot.

17. A fastener assembly comprising:
a lockable member defining a longitudinal axis and comprising a peripheral surface comprising an axially-extending slot defined therein;
a lock member releasably coupled to said lockable member, said lock member comprising a detent member extending radially outward from said lock member; and
a lock washer comprising an axial aperture defined therethrough, a central portion surrounding said aperture, a circumferential wall extending axially upward from said central portion, and at least one lock tab extending radially outward from said circumferential wall, said circumferential wall comprising a radially-inner surface, said radially-inner surface comprising a plurality of notches extending radially inward from said radially-inner surface, said at least one lock tab configured to be received within a recess defined in a substrate member to rotationally fix said lock member relative to the substrate member, each notch of said plurality of notches is configured to receive the detent member, wherein engagement of said detent member with said plurality of notches prevents rotation of said lockable member in a first rotation direction about the longitudinal axis, and wherein said lock member is positionable between a locked configuration in which said detent member is configured to engage said plurality of notches, and an unlocked configuration in which said detent member is spaced from said plurality of notches.

18. A fastener assembly as claimed in claim 17, wherein said lock member comprises an annular body and an axially-extending spring finger coupled to said annular body, said axially-extending spring finger comprising a free end extending radially inward relative to said annular body, said annular body comprising said detent member extending radially outward and circumferentially aligned relative to said axially-extending spring finger.

19. A fastener assembly in accordance with claim 18, wherein said annular body is positionable between the locked configuration in which said detent member is in a radially outward position, and the unlocked configuration in which said detent member is in a radially inward position.

20. A fastener assembly in accordance with claim 17, wherein said at least one lock tab comprises two diametrically opposed lock tabs.

\* \* \* \* \*